April 3, 1962        M. SONNINO        3,027,740
TOW-PROCESSING APPARATUS
Original Filed April 29, 1960
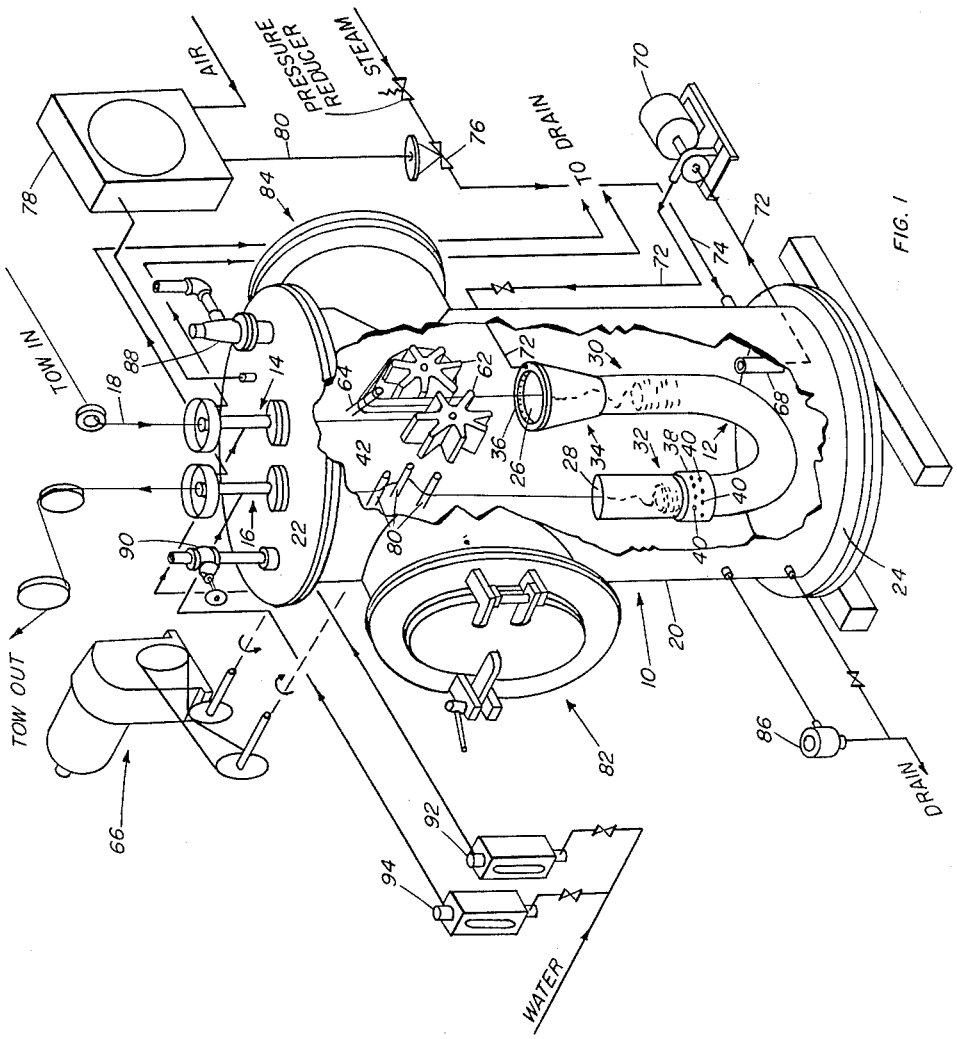
INVENTOR.
MARIO SONNINO
BY
Harold L. Kauffman
ATTORNEY – # United States Patent Office 3,027,740
Patented Apr. 3, 1962

3,027,740
TOW-PROCESSING APPARATUS
Mario Sonnino, Stamford, Conn., assignor to American Cyanamid Company, New York, N.Y., a corporation of Maine
Original application Apr. 29, 1960, Ser. No. 25,782. Divided and this application May 23, 1961, Ser. No. 114,280
4 Claims. (Cl. 68—5)

This invention relates broadly to tow-processing apparatus. More particularly, it is concerned with new and improved apparatus for processing a tow of filamentary material, especially a synthetic or artificial filamentary material, and specifically a polyacrylonitrile filamentary material, that is, one which is comprised of a polymer (fiber-forming polymer) of acrylonitrile. The invention is particularly concerned with apparatus which is particularly suitable for use in carrying out a continuous method for improving the quality of polyacrylonitrile structures in continuous filamentary form (i.e., as tow or yarn), and especially in such properties as loop and knot strengths, resistance to abrasion and to fibrillation, as well as dyeability, i.e., dye-receptivity.

Various methods of producing filaments, films and other shaped articles from homopolymeric acrylonitrile and from copolymers of a major proportion of acrylonitrile and a minor proportion of another monomer or monomers heretofore have been suggested. Thus, in Rein U.S. Patent No. 2,140,921, dated December 20, 1938, it is proposed that various polyvinyl compounds including polyacrylonitrile and copolymers of acrylonitrile with another vinyl compound be dissolved in concentrated aqueous solutions of inorganic (metal) salts, e.g., the chlorides, bromides, iodides, thiocyanates, perchlorates and nitrates, and that the resulting solutions be used in the manufacture of threads, films, etc. Similar solutions are used by Cresswell, as well as a low-temperature coagulating bath, in the process disclosed and claimed in, for instance, U.S. Patent No. 2,558,330, dated July 3, 1951, and others. Various organic solvent solutions of polyacrylonitrile and copolymers of at least 85% by weight of acrylonitrile with another monomer are disclosed in Latham U.S. Patent 2,404,714; Rogers U.S. Patents 2,404,715 and -725; Hansley U.S. Patent 2,404,-716; Houtz U.S. Patents 2,404,713-722, -724 and -727; Merner U.S. Patent 2,404,723; Charch U.S. Patent 2,404,-726; and Finzel U.S. Patent 2,404,728, all dated July 23, 1946, and also the use of such solutions in forming films, filaments, etc., therefrom.

Although processes such as are described briefly above and more fully in the aforementioned patents are, for the most part, operative and satisfactory in forming useful filamentary materials from homopolymeric and many different copolymeric acrylonitriles, processing improvements are often necessary in order to develop optimum properties in the product and/or to reduce its manufacturing cost. For example, in Hare et al. U.S. Patent No. 2,677,590 and in Moody U.S. Patent No. 2,677,591, are described processes for rendering substantially non-porous a porous, filamentary, polyacrylonitrile article which, in the latter state, has inferior properties.

The problems encountered by Hare et al. and Moody when using a spinning solution comprised of a polymer of acrylonitrile dissolved in an organic solvent are generally non-existent when using a spinning solution comprised of an acrylonitrile polymer dissolved in a concentrated aqueous solution of a water-soluble salt which yields highly hydrated ions in an aqueous solution, e.g., a thiocyanate and specifically sodium thiocyanate; and extruding this solution into a cold (not exceeding +10° C.) aqueous coagulating bath comprised of water alone or having dissolved therein from, for example, about 3% to about 20% by weight thereof of the same salt used in making the solvent for the acrylonitrile polymer, e.g., sodium thiocyanate. However, there does exist the same problem of collapsing the structure of the filamentary polyacrylonitrile in gel (specifically Aquagel or Hydrogel) state to a dense, compact solid while simultaneously removing the liquid phase (specifically water) therefrom. This problem of densifying or collapsing the structure was solved in a different way by Robertson and Klausner, namely, as disclosed and claimed in their copending application Serial No. 755,020, filed August 14, 1958, now Patent No. 2,984,912 of May 23, 1961, which application is assigned to a common assignee with that of the instant case and has now matured into Patent No. 2,984,912 dated May 23, 1961. The invention of Robertson and Klausner is based on their discovery that the structure of gelled, filamentary material comprised of water and an acrylonitrile polymer containing a major proportion by weight of combined acrylonitrile can be effectively and economically collapsed, and substantially uniform products of improved properties (e.g., better and more uniform dye receptivity, better abrasion resistance and "hand," less tendency to fibrillate, etc.) can be obtained by drying the said filamentary material under particular and critical correlated conditions of temperature and humidity.

Further improvement in the properties of an oriented, dried, polyacrylonitrile, filamentary material can be secured by heating it in a relaxed state (so-called "heat-relaxing") in an atmosphere of steam at a temperature above 100° C., preferably at least 105° C., but not higher than 160° C. For instance, in the copending application of Yoshimasa Fujita, Takeshi Okazaki and Keijiro Kuratani, Serial No. 25,783, filed April 29, 1960 (now abandoned), and assigned to a common assignee with that of the instant application, there is disclosed and claimed the method of improving the quality of fibers which have been hot-stretched (i.e., oriented by stretching while hot) and which are comprised essentially of an acrylonitrile polymer, which method comprises drying the said fibers under definite conditions of temperature and humidity to collapse their structure and make them dense, and thereafter treating the fibers in a relaxed state in an atmosphere of steam at an elevated temperature ranging from 105° C. to 160° C. The aforementioned Fujita et al. application Serial No. 25,783 has now been abandoned in favor of Fujita et al. copending application Serial No. 50,440, filed August 18, 1960, as a continuation-in-part of application Serial No. 25,783. The apparatus of the present invention can be used in that step of the process disclosed and claimed in the aforementioned Fujita et al. copending application which involves continuously treating a tow of a polyacrylonitrile filamentary material in an atmosphere of steam while it is in a relaxed state and at a temperature of from 105° C. to 160° C.

Another method of improving the properties of oriented, dried, polyacrylonitrile, filamentary material and which involves a steam treatment is disclosed in Schaefer et al. Patent No. 2,920,934, dated January 12, 1960. To obtain acrylonitrile polymer structures, specifically fibers or filaments, which are said not to fibrillate or to fibrillate to a negligible degree, it is suggested that the acrylonitrile polymer structure be subjected to a high temperature and pressure in the presence of saturated or wet stream. A tow or bundle of filaments is placed in an autoclave or other closed chamber, after which the apparatus is evacuated. Wet steam is introduced until a pressure of 30 to 60 p.s.i. is attained in the autoclave.

Immediately upon reaching the desired pressure, the chamber is vented and again evacuated. Thereafter, the vacuum in the chamber is broken and the filamentary material (e.g., tow or staple fibers) is removed therefrom. This wet-steam treating cycle is repeated as desired or as may be required. The process requires evacuation of the autoclave or other pressure equipment employed in order to reduce the color which tends to develop in the filamentary material during the wet-steam treatment.

The invention disclosed and claimed in the copending application of Allan O. Mogensen and Robert J. Stevens, Serial No. 25,512, filed April 29, 1960, and assigned to a common assignee with that of the instant application, is based on their discovery that filaments comprised of a polymer of acrylonitrile of the kind described in the aforementioned Patent No. 2,920,934 and also in, for example, the aforesaid Robertson et al. copending application Serial No. 755,020 and Fujita et al. copending application Serial No. 25,783 are improved in their useful properties by practicing the following technique.

An oriented, dried, polyacrylonitrile, filamentary material having a collapsed structure is brought into contact (e.g., by immersion) with an acidic fluid medium comprising water (in liquid and/or vapor state) and a reducing agent comprised of an oxygen-containing compound of sulfur (e.g., sodium or other alkali-metal metabisulfite) under certain particular and critical conditions of time and temperature. The contact or treatment is effected while the fluid medium is at a temperature above 100° C., and preferably at least about 105° C., but not higher than 160° C., and the period of the said contact is from 1 to 60 minutes. The contact between the filamentary material and the fluid medium is effected not later than the step of heat-relaxing the oriented, dried polyacrylonitrile filamentary material. Thus, it may be effected immediately prior to the step of heat-relaxing, or it may be effected concurrently with the step of heat-relaxing the filamentary material at a temperature above 100° C. but not higher than 160° C.

The invention disclosed and claimed in the aforementioned copending application of Mogensen et al. obviates or minimizes color degradation of the oriented, dried, polyacrylonitrile filamentary material having a collapsed structure while properties such, for example, as dyeability, knot strength and fibrillation resistance are improved. Unlike the prior art exemplified by the above-mentioned Patent 2,920,934 the technique of the Mogensen et al. invention is adaptable to a continuous process; or, if a batch operation is carried out, it avoids the necessity for evacuating the pressure-treating vessel during each cycle of operation, thereby saving time.

In the preferred embodiment of the Mogensen et al. invention wherein the treatment with the reducing agent comprising an oxygen-containing compound of sulfur is carried out concurrently with the heat-relaxation step that normally increases the fiber color, one is able to maintain the original color of the fiber substantially the same as it was before the treatment and thus avoid separate steps of bleaching and heat-relaxation. This preferred embodiment of the aforesaid Mogensen et al. invention can be carried out in apparatus of the present invention.

It is a primary object of the present invention to provide new and improved apparatus for the treatment of a tow of filamentary material, more particularly a tow of a polyacrylonitrile filamentary material.

Other objects of the invention will be apparent to those skilled in the art from the following description and the accompanying drawing.

The novel features which characterize my invention are set forth in the appended claims. The invention itself, however, will be understood most readily from the following more detailed description when considered in connection with the accompanying drawing wherein FIG. 1 is a perspective, broken-away, somewhat schematic view of apparatus embodying the invention; and FIG. 2 is a sectional view of part of the apparatus shown in FIG. 1.

The objects of the invention are attained by a novel and unobvious arrangement and combination of elements constituting the tow-processing apparatus of the invention.

The apparatus of the present invention is particularly useful in treating an oriented, dried, polyacrylonitrile, filamentary material. Such a filamentary material can be prepared by various methods including those set forth in the patents and copending applications mentioned hereinbefore. A preferred method involves dissolving an acrylonitrile polymer, that is, a homopolymer or copolymer of acrylonitrile, in a concentrated aqueous solution of an alkali-metal thiocyanate (e.g., sodium thiocyanate, potassium thiocyanate, lithium thiocyanate, etc.) to form a spinning solution. The concentration of the alkali-metal thiocyanate in the water in all cases is sufficiently high so that the resulting solution will dissolve the acrylonitrile polymer. In most cases the concentration of thiocyanate is substantially above 40% (e.g., from 45–50% to 55–60%) of the total weight of the solution of thiocyanate dissolved in water, the upper limit being a saturated solution of the thiocyanate in water.

In forming the gelled, polyacrylonitrile filaments, an alkali-metal thiocyanate solution of an acrylonitrile polymer of the kind described above, after filtration and deaeration, is passed under pressure to an extrusion head and thence through the openings or orifices in a spinnerette into a liquid coagulating bath comprising an aqueous solution containing from about 3% (preferably at least about 5%) to about 20%, by weight, of an alkali-metal thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinnerette it coagulates or precipitates in the form of gelled filaments upon entering the above coagulating bath. (In the preferred method, the coagulating bath is maintained at a temperature not exceeding +10° C. by any suitable means, and in some cases advantageously is maintained at or below 0° C., e.g., at −9° C. to −0.5° C.) By using such a coagulating bath, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of drying, greater amenability to dyeing, etc.

If desired, a water-miscible alcohol also may be incorporated into the coagulating bath along with the alkali-metal thiocyanate as is described more fully in, for instance, British Patents Nos. 732,135 and 738,759. Such alcohols include methyl, ethyl, propyl, isopropyl, n-butyl, sec.-butyl and tert.-butyl alcohols, which constitute a preferred class because of their relatively low boiling points; although one can also use the higher monohydric alcohols as well as the various polyhydric alcohols (e.g., dihydric, trihydric, etc.), these are less desirable from an economic and operating standpoint. The alcohol, if employed, generally constitutes at least 4%, e.g., from 5% to 15%, by weight of the bath.

Instead of, or in addition to, the modification which comprises incorporating an alcohol in the coagulating bath, one can also add an alcohol to the spinning solution as is described more fully in, for instance, British Patent No. 714,530.

When alcohol is a component of the spinning solution, or the coagulating bath, or both, the bath temperature may range, for instance, from −15° C. to +10° C., as in the aforementioned U.S. Patent No. 2,558,730, or at higher temperatures ranging, for example, up to 40° C. The gelled, polyacrylonitrile filamentary material obtained under these conditions is a hydrogel-alcogel product, that is, it contains both water and alcohol in the gel structure in addition to the alkali-metal thiocyanate and the polyacrylonitrile.

After emerging from the coagulating bath the extruded filamentary material may be given a cold solvent stretch, followed by washing and then hot stretching. If the initial stretch is omitted, the gelled filaments are suitably treated for the removal of thiocyanate immediately after leaving the coagulating bath. Such a treatment may take various forms, e.g., washing either in a series of troughs or while passing over a series of upper and lower serpentine rolls, the lower rolls of the series being immersed (or partly immersed) in a series of wash troughs. If serpentine washing technique be employed, the rolls over which the filaments pass during the washing step may all operate at the same peripheral speed or with each or some at a peripheral speed slightly lower than the one immediately preceding it in the series. Washing may be done with water alone at normal (e.g., 15°–30° C.) or at an elevated temperature (e.g., 35°–50° C.), or even at a reduced temperature (e.g., 1° C. up to 15° C.); or, if desired, one could use mixtures of water and an alcohol (e.g., ethanol), or other solvents. If desired, a series of countercurrent wash troughs or vessels can be used, or any other suitable washing devices.

After washing, the gelled, polyacrylonitrile, filamentary material is hot-stretched, e.g., between rolls (or series of rolls) the latter of which are operated at a higher peripheral speed than the former. This stretch is effected while the gelled material is in contact with moisture and at a temperature within the range of about 70° C. to about 110° C., preferably while it is in contact with water at a temperature of about 70° C. to about 100° C. When temperatures above 100° C. are to be employed, the medium may be steam or hot water under superatmospheric pressure. Good results are obtained when the aqueous fluid medium in which the gelled, filamentary material is stretched is water within the range of about 90° C. to about 100° C. The degree of stretch may be widely varied but generally is from three to fifteen times the length of the unstretched material. If the freshly extruded, gelled filaments have been given a cold, solvent stretch (e.g., as is more fully disclosed in the application of P. W. Cummings, Jr., Serial No. 554,155, filed December 20, 1955, now Patent No. 2,948,581, dated August 9, 1960), then the washed, filamentary material (or filamentary material which has been otherwise treated for the removal of thiocyanate) is generally stretched to between one and one-half and ten times its once-stretched length, the second stretch being correlated with the first stretch so that the total stretch is to from three to fifteen times the length of the said filamentary material immediately before the first stretch.

After being hot-stretched, the filamentary material may be rinsed if desired with, for example, water. Such a rinsing operation, however, is optional and may be omitted.

Following the rinsing step (if applied to the gelled material) the gelled filaments are preferably dried under the temperature and humidity conditions disclosed and claimed in the aforementioned Robertson et al. copending application Serial No. 755,020, thereby to collapse the structure of the fiber and to improve its useful properties.

The polyacrylonitrile filamentary material after being dried or otherwise treated to collapse its structure ordinarily is next processed by the technique and using the apparatus of the present invention.

Referring to the drawing and, more particularly, to FIG. 1 thereof there is shown by way of illustration a tow-processing apparatus comprising a vessel 10 which is adapted to be maintained under superatmospheric pressure; a J-box 12 within said vessel; and means including an inlet port 14 and an outlet port 16 for introducing the tow 18 into and out of the vessel 10 while the vessel is under superatmospheric pressure.

The vessel 10 has a side wall 20, a removable head 22 and, preferably, a removable bottom 24. The inlet port 14 and the outlet port 16 are aligned with the inlet opening 26 and the outlet opening 28 of the J-box 12, which can be made wholly or partly of heat-resistant glass if desired, thereby permitting ready observation of the movement of the tow in the said J-box.

The J-box 12 is comprised of a long leg 30 and a short leg 32. Preferably it has a funnel-shaped inlet 34 at the long leg 30 of the J of the J-box 12 and means including a spray means, specifically a spray ring 36, arranged about the said funnel-shaped inlet and adapted to spray a hot fluid medium, specifically hot water, therein. Suitable means are advantageously provided for releasing at least part of the hot fluid medium comprising water from the short leg 32 of the J-box 12 prior to reaching the outlet opening 28 of the leg 32. Said means conveniently may take the form of a collar 38 having openings 40 therein.

The J-box 12 constitutes an inner treating zone in which the tow 18 of filamentary material, e.g., one comprised of polyacrylonitrile and/or other organic filaments, is treated with a hot fluid medium comprising water under superatmospheric pressure. This hot fluid medium is at a temperature above 100° C., preferably from about 105° C. to about 160° C., e.g., 120° to 140° or 150° C.

The inlet port 14 and the outlet port 16 provide means for permitting the tow 18 to enter and leave the vessel 10 without substantial loss of pressure within the vessel. The tow 18 is admitted into the vessel 10 and into the outer zone 42 thereof and from thence into the inner treating zone provided by the J-box 12.

Referring now to FIG. 2, this is a cross-sectional view of inlet port 14 and of outlet port 16, each being of the same design. Such ports are comprised of an elongated jacket 44 having upper closure means 46 and lower closure means 48 for closing the upper and lower ends, respectively, of the jacket 44. Positioned within this jacket are the upper tube 50 and the lower tube 52 which are spaced apart and are coaxial with the jacket 44. The tubes 50 and 52 preferably taper slightly outwardly at their ends in order to facilitate the movement of the filamentary material therethrough. These tubes can be removed and replaced quickly by unscrewing the O-ring-sealed end fittings. The upper end of the upper tube 50 extends through the upper closure means 46 into a header 54 attached to the jacket 44 and having a bottom drain 56. In operation, water overflows out of the upper part of the tube 50 into the header, which acts as a reservoir until the water is drained off through the bottom drain 56. Any desired level of water may be maintained in this header by controlling the rate at which it is drained off. For example, it may be advantageously maintained at a level which is at or above that of the upper opening of the tube 50. The end of the lower tube 52 extends through the lower closure means 48 into the vessel 12, and more particularly into the outer zone 42 thereof.

The distance between the lower end of the upper tube 50 and the upper end of the lower tube 52 may be varied considerably, but normally is relatively short as compared with the overall length of both tubes.

Injection means 58 are provided for injecting cold water into the side of the jacket 44 at a point above the space 60 between the upper tube 50 and the lower tube 52. This cold water cools the tow and, by joining with the tow, aids in maintaining the desired pressure within the vessel and minimizes or obviates steam losses.

The member 61 is attached to the lower part of the tube 50 at a point before the bottom opening thereof, and fits closely to the inner wall of the jacket 44 thereby aiding in maintaining the tube 50 centrally positioned vertically within the said jacket. The member 61 is provided with a plurality of means for permitting the passage of water therethrough. Such means may take the form of, for example, vertical slots or vertical openings. Thus, by way of illustration, member 61 is shown as being provided with a plurality of vertical slots, two of which are indicated at 96 and 98. Such slots or openings permit cold water to flow from injection means 58 into the elongated jacket 44, and specifically into space 60. At this point, i.e., 60, the water joins the tow and flows concurrent or countercurrent through the upper tube 50 and lower tube 52 (depending upon whether the unit is being used as inlet port 14 or outlet port 16) at a velocity such that the friction developed by the water flow in the length of the two tubes 50 and 52 corresponds to the pressure to be maintained in the vessel 10.

Instead of locating the slots 96 and 98 (and others not shown in the drawing) at the inner perimeter of the member 61, they can be located at the outer perimeter of said member. Or, in lieu of or in addition to such slots, the member 61 can be drilled or otherwise perforated to provide a plurality of the aforementioned vertical openings or holes therein.

The elements comprising the structure shown in FIG. 2 constitute hydraulic pressure-sealing means (hydraulic friction-sealing means) that in operation permit the tow 18 to enter and leave the vessel 12 without substantial loss of pressure within the vessel.

If desired, the hydraulic pressure-sealing means may be varied to meet the particular conditions of operation. For example, the outlet port 16 may be constructed with a divided inner tube (i.e., two tubes 50 and 52 as shown in FIG. 2); while inlet port 14 may be constructed with only a single, continuous inner tube surrounded by a water jacket to condense steam and prevent leakage. Such an arrangement is only partly satisfactory because of leakage when the tow stops moving, and is not the equivalent of the design shown in FIG. 2. Likewise, and particularly at the outlet port, an arrangement of the hydraulic-sealing means wherein the short tube 52 is above the long tube 50 is not the full equivalent of the arrangement shown in FIG. 2.

Referring back now to FIG. 1, it will be noted that means are provided for feeding the tow 18 into the long leg 30 of the J-box 12. Such means advantageously may take the form of a pair of meshing star-shaped rolls 62. Particularly good results are obtained when such star-shaped rolls are used in conjunction with a rigid bar 64. This bar is mounted in an inclined position above the rolls in such a manner that the incoming tow can be fed into the nip of the rolls, then around one roll and then over the said rigid bar, which latter causes the tow to space itself on the roll about which it is wound. Suitable means such as the drive indicated at 66 are provided for driving the meshing star-shaped rolls 62.

The vessel 10 is provided with suitable means such as the standpipe 68 for maintaining a hot fluid medium comprising water at a desired level in the lower part of the vessel 10, which advantageously is a cylindrical vessel. Means also are provided, such as those indicated by the pump 70 and the transfer lines 72, for transferring part of the hot fluid medium comprising water, specifically hot water at a temperature within the range of from above 100° C., more particularly from about 105° C. to about 160° C., from the lower part of the vessel 10 to the spray ring 36.

Means also are provided for introducing steam from a supply source (not shown) through the line 74 provided with the control valve 76 into the vessel 10. Advantageously this steam is introduced into the vessel 10 beneath the level of the hot fluid medium comprising water that, during operation, is in the lower part of the cylindrical vessel 10. Introducing the steam into the vessel in this way instead of elsewhere therein was found to reduce the pressurizing time of a pilot-plant unit from 20–25 minutes to 3–5 minutes. A temperature-indicating controller 78 and line 80 provides means by which the temperature of the steam entering the vessel 10 can be controlled by means of control valve 76. Cold water, preferably cold, deionized water, is injected at a steady rate into the inlet and outlet ports 14 and 16, respectively, in the manner described more fully hereinbefore. The excess water that accumulates from these seals or ports and the water from the condensed steam are removed by means of a steam trap 86.

Suitable means also are provided for aligning the tow and removing tangles and/or small or loose knots therefrom after the tow leaves the outlet 28 of the short leg 32 of the J-box 12. These means are provided before the tow leaves the vessel 10 through the outlet port 16. Such means may take the form of the spaced-apart bars 80 wherein the first and the last are in the same vertical plane while an intermediate bar is disposed to one side of the said vertical plane.

Visual means (not shown) are provided for observing the action of the star-shaped rolls 62 and the J-box 12 that are within the vessel 10. A quick-opening door 82 in the side wall 20 of the vessel 10 provides ready access to the tow 18 therein during operation of the apparatus; while another opening 84 in the side wall 20 of the vessel 10 provides additional means for the convenient assembly of the internal parts of the said vessel.

Included in the removable head 22 of the apparatus is a relief valve 88 for safety and a vent valve 90 to bring the unit to atmospheric pressure when necessary.

Flow meters 92 and 94 provide means for measuring the amount of water which is introduced to the inlet port 14 and the outlet port 16, respectively.

In the operation of the apparatus a tow of polyacrylonitrile filamentary material or of other natural or synthetic filamentary material whose useful properties can be improved by processing through the apparatus of this invention is introduced into an outer zone having tow-inlet and -outlet ports and maintained under superatmospheric pressure. The inlet port through which said tow enters said outer zone is hydraulically sealed. Preferably the tow is wetted, e.g., with water, either prior to or during its passage through the inlet port 14. The tow is positively fed from the aforesaid outer zone into the inlet of an inner treating zone in the form of a J. This treating zone also is under superatmospheric pressure. Means are provided for maintaining a reservoir of a hot, fluid medium, more particularly a hot, fluid medium comprising water, in the said outer zone; and, also, for circulating the said hot, fluid medium from the said outer zone to the said treating zone. In this inner, treating zone the tow is treated, while it is in a relaxed state, for from 1/6 to 60 minutes, usually from 1/4 to 30 minutes, with the said hot, fluid medium which is at a temperature above 100° C. and, advantageously, not higher than about 160° C., more particularly within the range of from about 105° C. to about 160° C. Thereafter the treated tow is conducted from the outlet of the said treating zone into and out of the said outer zone while hydraulically sealing the outlet port through which the said tow leaves the said outer zone.

The tow is fed positively into the inlet opening 26 of the J-box 12; that is to say, the tow is pulled into the vessel 10 at a regular, controlled rate, and then is permitted to fall freely at a regular rate into the inlet opening 26 of the J-box 12. In a typical example of a pilot-plant unit the positive rolls are star-shaped and mesh together with an overlap of approximately 1 inch. Each roll has 16 vanes 2¼ inches by 6 inches mounted on a 7¼-inch diameter hub. Above one roll there is a rigid ½-inch diameter bar mounted in an inclined position. The tow is fed into the nip of the rolls, then around one roll and then over the aforesaid bar. Two, three or more wraps are made in this manner until a positive pull is effected.

All of the wraps are made on the same roll where the inclined bar causes the tow to space itself. The star rolls are adjustable both with respect to the nip between the rolls and the speed at which they are caused to operate.

As has been previously mentioned, the tow falls freely, that is, in a relaxed state, from the star-shaped rolls into the inlet opening 26 of the J-box 12. The J-box advantageously is constructed of stainless steel and glass. In a typical pilot-plant unit the long leg 30 of the J has a funnel-shaped inlet with a 6-inch diameter opening at the top and tapered down to a 3-inch glass pipe. A circular spray ring 36 is arranged at the inlet so as to spray hot water into the unit to assist in the movement of the tow. A suitable distance, for example about one-half of the way, up the short leg 32 of the J there is a perforated, stainless steel collar 38 to release at least part of the water from the J-box. In a typical pilot-plant operation, approximately 30 meters of tow is retained in the J-box. As it leaves the J-box, tangles and snags in the tow are removed by suitable means, e.g., by passage in the manner indicated in FIG. 1 over the three stationary pins 80 which are arranged as there shown.

The unit can be equipped with automatic speed controls or it can be regulated manually. The star rolls can be driven by a motor having a variable speed drive unit provided with a hand adjustment for speed change. By adjusting this speed change the operator of the unit can maintain a correct level of tow in the J-box 12.

The flow of hot, fluid medium comprising steam to the unit is automatically controlled. Water make-up (through the inlet and outlet ports) conveniently may be adjusted manually, the rate of flow being indicated by the flow meters 92 and 94. Automatic control of the flow of water can be employed if desired. The tow is pulled away from the unit through the outlet port 16 by other equipment employed in the manufacturing process.

The diameter (inside diameter) of the tubes 50 and 52 has a somewhat critical relationship to the total denier of the tow, the tow speed and the pressure within the vessel 10. A combination that was satisfactory in the operation of a pilot-plant unit was as follows:

| | |
|---|---|
| Tow speed | 85 m./min. |
| Total denier of tow | 40,000 to 53,300. |
| Inside diameter of inner tube of inlet port | 0.245 inch. |
| Inside diameter of inner tube of outlet port | 0.185 inch. |
| Pressure within vessel | 20 lbs./sq. in. (gauge pressure). |

As has been mentioned hereinbefore, the apparatus of the present invention can be used in carrying out one embodiment of the invention disclosed and broadly and specifically claimed in the aforementioned copending application of Mogensen et al., Serial No. 25,512. More particularly it can be used in that embodiment of the Mogensen et al. invention wherein an oriented, dried, polyacrylonitrile, filamentary material is contacted with a particular fluid medium concurrently with the step of heat-relaxing the filamentary material at a temperature above 100° C. but not higher than 160° C. The contacting period in the invention of Mogensen et al. is from about 1 minute to 60 minutes. The fluid medium is an acidic fluid medium comprising water and a reducing agent comprised of an oxygen-containing compound of sulfur.

In order that those skilled in the art better may understand how the present invention can be carried into effect, the following examples are given by way of illustration and not by way of limitation. All parts and percentages are by weight.

*Example 1*

A terpolymer is made from a monomeric mixture of 85.2% acrylonitrile, 8% vinyl acetate and 6.8% 2-methyl-5-vinylpyridine by polymerizing in an aqueous medium with an oxidation-reduction catalyst system comprised of chloric acid and sulfurous acid by known methods, e.g., as described in Cresswell U.S. Patent No. 2,751,374, dated June 19, 1956. This polymer is washed with water, ammonia, and water, and then dissolved in about 47.5% aqueous sodium thiocyanate to make a solution containing about 10% polymer solids. After deaeration and filtration the polymer solution is preheated and then extruded through a spinnerette having 6372 holes of 65 microns diameter at a rate calculated to yield a final fiber of 3.0 denier/filament, at a stretched speed of 110 meters/min. The extruded solution is coagulated in a bath containing 10% aqueous sodium thiocyanate at 0° C. The resulting fiber is cold-stretched 1.07 times, washed, treated with ammonia as taught in U.S. Patent No. 2,916,348, and hot-stretached 7.9 times at about 99° C. The total stretch is about 8.5 times the original length. The stretched tow is charged to a moving belt or conveyor, upon which it is laid down transversely, at a rate of 110 m./min., and passed through a drying and conditioning zone maintained at 245° F. dry-bulb and 155° F. wet-bulb temperatures. The residence time in this heated zone is 15 minutes. The dried tow of polyacrylonitrile filaments has a collapsed structure.

The tow is drawn from the drying and conditioning unit by the draw rolls 62 of a tow-relaxation unit of the kind illustrated in FIG. 1. Due to shrinkage in the dryer the tow is fed into the relaxation unit at the rate of 96 m./min., and is drawn out of the unit at the rate of 75 m./min. by other equipment in the process. The speed to and out of the relaxation unit is balanced to maintain a constant period of time in the relaxation unit. In this example the time that the tow is in the relaxation unit is between about 45 and 60 seconds.

The unit is operated as described in the portion of this specification prior to the examples with reference to FIGS. 1 and 2. The control of the pressure within the chamber is maintained by means of the temperature which is closely controlled at 128° C.±½° C., which corresponds to a gauge pressure of about 20 pounds per square inch.

The heat-relaxed tow is crimped, cut into staple (if desired) and further processed by conventional techniques. Some of the properties of the finished product are tabulated below. In certain cases there are shown in parentheses the corresponding properties of a product which had been prepared in substantially the same manner with the exception that the tow had not been heat-relaxed after being dried and conditioned.

| | |
|---|---|
| Denier | 2.9. |
| Tenacity, crimped, gm./den | 3.2. |
| Elongation, crimped, percent | 46.6. |
| Loop tenacity, crimped, gm./den. | 2.4 (before heat-relaxation: 1.1). |
| Loop elongation, crimped, percent | 35.5 (before heat-relaxation: 7.3). |
| Residual shrinkage, percent | 1.5. |
| Dyeability, acid dye, percent | 101.8 (before heat-relaxation=100%). |
| Dyeability, chrome dye, percent | 105.0 (before heat-relaxation=100%). |
| Dyeability, basic dye, percent | 106.7 (before heat-relaxation=100%). |
| Stoll abrasion, warp, cycles to failure | 1570 (non-heat-relaxed: 358). |
| Stoll abrasion, filling, cycles to failure | 990 (non-heat-relaxed: 233). |
| Fibrillation, percent original color | 100 (non-heat-relaxed: 90). |
| Abrasion, Accelerator, percent wt. loss | 3.28 (non-heat-relaxed: 5.1%). |

Example 2

The same procedure is followed as described under Example 1 in making a 15-denier tow with the following exceptions:

The spinnerette has 1596 holes of 165 microns diameter, and the polymer solution is extruded through this spinnerette at a rate calculated to yield a final fiber of 15 denier/filament, at a stretched speed of 54 meters per minute. Also, the stretched tow is charged to the moving belt for passage through the drying and conditioning zone at a rate of 54 m./min. instead of 110 m./min. as in Example 1. The residence time of the tow in the aforesaid zone or unit is 20 minutes instead of 16 minutes as in Example 1. The dried and conditioned tow is fed into the tow-relaxation apparatus at the rate of 45 m./min. and is drawn out of the unit at the rate of 38 m./min., instead of 96 and 75 m./min., respectively, as in Example 1.

Some of the properties of the finished product are tabulated below. In certain cases there are shown in parentheses the corresponding properties of a product which had been prepared in substantially the same manner with the exception that the tow had not been heat-relaxed after being dried and conditioned.

Denier _____ 14.8.
Tenacity, crimped, gm./den _____ 2.3.
Elongation, crimped, percent ____ 35.4.
Loop tenacity, crimped, gm./den_ 1.7 (before heat-relaxation: 1.2).
Loop elongation, crimped, percent_ 24.2 (before heat-relaxation: 11.0).
Residual shrinkage, percent _____ 0.8.
Dyeability, acid dye, percent _____ 99.1 (before heat-relaxation=100%).
Dyeability, chrome dye, percent __ 172.6 (before heat-relaxation=100%).
Dyeability, basic dye, percent ____ 284.8 (before heat-relaxation=100%).
Stoll abrasion, warp, cycles to failure _____ 3942 (non‑heat‑relaxed: 723).
Stoll abrasion, filling, cycles to failure _____ 4037 (non‑heat‑relaxed: 462).
Fibrillation on fabric, percent original color _____ 102 (non‑heat‑relaxed: 88).
Abrasion, Accelerator, on fabric, percent wt. loss _____ 6.13 (non‑heat‑relaxed: 13.6).

Example 3

Exactly the same procedure is followed as in each of Examples 1 and 2 with the exception that the polyacrylonitrile filamentary material is one wherein the acrylonitrile constitutes at least 80% of the total amount of copolymerizable ingredients and the remainder is at least one other monoethylenically unsaturated substance including methyl acrylate. Specifically, the polyacrylonitrile filamentary material is comprised of a copolymer obtained by polymerization of a mixture of, by weight, about 90% acrylonitrile and about 10% methyl acrylate. Similar improvements in useful properties are secured as described under Examples 1 and 2 with reference to the products of those examples.

Instead of the filamentary copolymer of acrylonitrile, vinyl acetate and 2-methyl-5-vinylpyridine employed in Examples 1, 2 and 3 there can be used, in making the filaments, homopolymeric acrylonitrile or, for example, one of the following acrylonitrile copolymers:

95% acrylonitrile and 5% 2-vinylpyridine
92% acrylonitrile and 8% 2-methyl-5-vinylpyridine
95% acrylonitrile and 5% 2-vinyl-5-ethylpyridine
85% acrylonitrile, 7.5% methyl acrylate and 7.5% 2-vinylpyridine
84% acrylonitrile, 8% acrylamide and 8% 2-methyl-5-vinylpyridine
90% acrylonitrile, 5% hydroxyethyl methacrylate and 5% 2-methyl-5-vinylpyridine
86% acrylonitrile, 7% allyl alcohol and 7% 2-vinyl-5-ethylpyridine (or 7% 2-methyl-5-vinylpyridine)

One can also use any of the following copolymer compositions:

95% acrylonitrile and 5% vinyl acetate
95% acrylonitrile and 5% acrylamide
92% acrylonitrile and 8% dimethylaminoethyl methacrylate
90% acrylonitrile, 5% vinyl acetate and 5% methyl acrylate
80% acrylonitrile, 5% methacrylonitrile and 5% vinyl acetate The foregoing copolymeric acrylonitriles are made into tow and processed as described under Examples 1, 2 and 3 with similar improvements in useful properties by the described heat-relaxation treatment and wherein are utilized the apparatus and method of the present invention.

The preferred filament-forming acrylonitrile polymers that are used in making filaments, which subsequently are treated in tow form in accordance with the present invention, are those containing, by weight, a major proportion (more than 50%) of acrylonitrile and a minor proportion (less than 50%) of a vinylpyridine combined in the polymer molecule, and especially those containing by weight, at least 80% acrylonitrile and at least 2% of a vinylpyridine (preferably a methyl vinylpyridine including 2-methyl-5-vinylpyridine). A preferred sub-class within this broader class is that comprised of filament-forming copolymers of, by weight, from 80% to 96% acrylonitrile, from 2% to 10% of a vinylpyridine (and which preferably includes 2-methyl-5-vinylpyridine) and from 2% to 10% of a third different monoethylenically unsaturated material, e.g., vinyl esters including the formate, acetate, propionate; the various acrylic esters including the lower alkyl acrylates and methacrylates such as the methyl, ethyl and propyl acrylates and methacrylates; the various acrylamides including acrylamide itself and methacrylamide; the various acrylic acids including acrylic acid itself and methacrylic acid; methacrylonitrile and other copolymerizable substituted acrylonitriles; unsaturated alcohols including allyl alcohol; vinyl-substituted aromatic hydrocarbons, e.g., styrene, the various ring-substituted methylstyrenes; isopropenyl toluene; and others including those given by way of example in, for instance, Cresswell U.S. Patent No. 2,558,730, dated July 3, 1951 (column 3, lines 31–55), and Price U.S. Patent No. 2,736,722, dated February 28, 1956 (column 4, line 66 through line 27 in column 5). The "third different monoethylenically unsaturated material" mentioned above includes within its meaning a plurality of such materials.

Vinylpyridines which can be employed in making copolymers with acrylonitrile, and used as herein described, are vinylpyridines represented by the formula

I

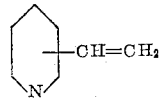

and which include 2-vinylpyridine, 3-vinylpyridine and 4-vinylpyridine; methyl vinylpyridines represented by the formula

II

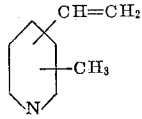

and which include 2-methyl-3-vinylpyridine, 3-vinyl-4- methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine and 3-methyl-4-vinylpyridine. The vinylpyridines embraced by Formula II are a preferred subgroup wthin a broader class of vinylpyridines that are advantageously employed in making copolymers which, in continuous filamentary form, are used in practicing the present invention and which may be represented by the formula II 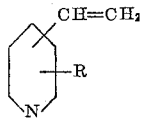

and wherein R represents a lower alkyl radical, more particularly a methyl, ethyl, propyl (including n-propyl and isopropyl) or butyl (including n-butyl, isobutyl, sec.-butyl and tert.-butyl) radical. Other examples include 2-vinyl-4,6-dimethylpyridine, the 2- and 4-vinylquinolines, 2-vinyl-4,6-diethylpyridine and others embraced by the formula IV 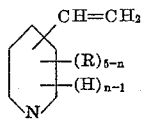

wherein R represents a lower alkyl radical, examples of which have been given hereinbefore, and $n$ represents an integer from 1 to 5, inclusive.

One can substitute in the copolymers employed in making the filaments used in the processes of Examples 1, 2 and 3 an equivalent amount of any of the vinylpyridines, of which numerous examples have just been given, for the specific vinylpyridine named in the individual copolymer, and then make spinning solutions from which filamentary polyacrylonitrile is produced and treated in accordance with the present invention.

When dye receptivity, especially toward acid dyes, is a matter of secondary consideration, the vinylpyridine can be omitted from the above-described formulations for making the copolymer.

Ordinarily, the molecular weight (average molecular weight) of the acrylonitrile homopolymer or copolymer is within the range of from about 30,000 to about 200,000, more particularly from about 40,000 to about 100,000, and still more particularly from about 60,000 to about 80,000, as calculated from a viscosity measurement of the said copolymer in dimethyl formamide using the Staudinger equation (reference: Houtz U.S. Patent No. 2,404,713, dated July 23, 1946). Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a filaments-forming material and such polymers can, therefore, be used in forming the spinning solutions from which are made the filamentary materials that are treated in accordance with the present invention.

The apparatus of my invention is applicable in the processing of any tow or bundle of filamentary material (crimped or uncrimped) which is to be continuously treated with a fluid medium under superatmospheric pressure. It is particularly suitable for use in treating a tow of an organic filamentary material (both natural and synthetic) and especially tows of synthetic filamentary materials such as those which are now commercially available. Examples of the latter are those made from polymers (more particularly copolymers) of acrylonitrile; polyesters; polyamides; polyureas; polyolefins including polyethylene and polypropylene, and copolymers of ethylene and propylene; cellulose esters; the various rayons (regenerated celluloses); vinyl halide (including the chloride) copolymers; vinylidene cyanide copolymers; vinylidene halide (including the chloride) copolymers; homopolymers and copolymers of chlorotrifluoroethylene; and modifications and blends of those just mentioned by way of example. The apparatus of the invention is particularly useful in treating filamentary materials capable of further relaxation when heated at an elevated temperature, including those filamentary materials mentioned above that are thusly characterized.

The apparatus of my invention can be used in carrying out an economical and efficient method of improving the properties of a filamentary material, specifically a polyacrylonitrile filamentary material, e.g., improvements in knot strength, loop strength and loop elongation. My improved apparatus also make it possible to secure better penetration of dyes into the filaments; in other words, better dye-receptivity.

The term "tow" as used hereinbefore and in the appended claims includes a plurality of continuous filaments irrespective of the number of filaments in the bundle. The term includes bundles of smaller size such as those which are often referred to in the art as "continuous filament yarns."

This application is a division of my copending application Serial No. 25,782, filed April 29, 1960.

I claim:

1. Tow-processing apparatus comprising a vessel having a removable head and adapted to be maintained under superatmospheric pressure; a J-box within said vessel and having its inlet and outlet openings at the long and short legs of the J of the said J-box; inlet and outlet ports attached to said removable head and aligned with the inlet and outlet openings of the said J-box, said ports comprising an elongated jacket, upper and lower closure means closing the upper and lower ends of the said jacket, spaced-apart upper and lower tubes within said jacket and coaxial therewith, the upper end of the upper tube extending through the upper closure means into a header attached to said jacket, said header having a bottom drain which permits the maintenance of a desired level of water therein, and the lower end of the lower tube extending through the lower closure means into the said vessel, the distance between the lower end of the upper tube and the upper end of the lower tube being relatively short as compared with the overall length of both tubes, and means for injecting cold water into the side of the said jacket at a point above the space between the said upper and lower tubes, the aforesaid elements comprising hydraulic pressure-sealing means that in operation permit the tow to enter and leave the said vessel without substantial loss of pressure within the vessel; means within the said vessel for positively feeding the tow into the long leg of the said J-box; and means for introducing steam under superatmospheric pressure into said vessel.

2. Tow-processing apparatus comprising a cylindrical vessel having a removable head; means for maintaining said vessel under superatmospheric pressure; a J-box within said vessel and having its inlet and outlet openings at the long and short legs of the J, respectively, of the said J-box; a spray means adjacent the inlet opening of the said J-box and adapted to spray a hot fluid medium comprising water into the said inlet opening; means for introducing tow into and from said vessel while the vessel is under superatmospheric pressure, said means including inlet and outlet ports attached to said removable head and aligned with inlet and outlet openings of the said J-box, said ports each having hydraulic pressure-sealing means that in operation permit the tow to enter and leave the said vessel without substantial loss of pressure within the vessel; means including a pair of meshing star-shaped rolls for positively feeding the tow into the long leg of the said J-box; means for driving said rolls; means including a standpipe for maintaining a hot fluid medium comprising water at a desired level in the lower part of the said cylindrical vessel; means for transferring part of the said fluid medium from the said lower part of the said vessel to the said spray means; and means for introducing a hot fluid medium comprising steam under superatmospheric pressure beneath the level of the said hot fluid medium comprising water which is in the lower part of the said cylindrical vessel.

3. Tow-processing apparatus comprising a cylindrical vessel having a side wall and removable top and bottom walls; means for maintaining said vessel under superatmospheric pressure; a J-box within said vessel and having a funnel-shaped inlet at the long leg of the J of the said J-box; means including a spray ring arranged about the said funnel-shaped inlet and adapted to spray hot water therein; means for releasing water from the short leg of the said J-box prior to reaching the outlet opening of said leg; means for introducing tow into and from said vessel while the vessel is under superatmospheric pressure, said means including inlet and outlet ports attached to said removable head and aligned with the inlet and outlet openings of the said J-box, said ports each having hydraulic pressure-sealing means that in operation permit the tow to enter and leave the said vessel without substantial loss of pressure within the vessel; means for positively feeding the tow into the long leg of the said J-box, said means including a pair of meshing star-shaped rolls and a rigid bar mounted in an inclined position above the rolls in such manner that the incoming tow can be fed into the nip of the rolls, then around one roll and then over the said rigid bar, which latter causes the tow to space itself on the roll about which it is wound; means for driving said rolls; means for aligning the tow and removing tangles therefrom after the tow leaves the outlet of the short leg of the said J-box and before it leaves the said cylindrical vessel through the aforementioned outlet port; means including a standpipe for maintaining hot water at a desired level in the lower part of the said cylindrical vessel; means for transferring part of the said hot water from the said lower part of the said vessel to the said spray ring; means for introducing superheated steam beneath the level of the said hot water that is in the lower part of the said cylindrical vessel.

4. Tow-processing apparatus comprising a vessel having a side wall, a removable head and a removable bottom, and which is adapted to be maintained under superatmospheric pressure; a J-box within said vessel, said J-box having a funnel-shaped inlet and having its inlet and outlet openings at the long and short legs of the J of the said J-box; means including a spray ring arranged about the said funnel-shaped inlet and adapted to spray hot water therein; means for releasing at least part of the hot fluid medium comprising water from the aforesaid short leg of the J of the said J-box, said means including a perforated collar in the short leg of the said J-box prior to reaching the outlet opening of said leg; means for introducing tow into and from said vessel while the vessel is under superatmospheric pressure, said means including inlet and outlet ports attached to said removable head and aligned with the inlet and outlet openings of the said J-box, said ports comprising an elongated jacket, upper and lower closure means closing the upper and lower ends of the said jacket, outwardly tapered spaced-apart upper and lower tubes within said jacket and coaxial therewith, the upper end of the upper tube extending through the upper closure means into a header attached to said jacket, said header having a bottom drain which permits the maintenance of a desired level of water therein, and the lower end of the lower tube extending through the lower closure means into the said vessel, the distance between the lower end of the upper tube and the upper end of the lower tube being relatively short as compared with the overall length of both tubes, and means for injecting cold water into the side of the said jacket at a point above the space between the said upper and lower tubes, the aforesaid elements comprising hydraulic pressure-sealing means that in operation permit the tow to enter and leave the aforesaid vessel without substantial loss of pressure within the vessel; means for positively feeding the tow into the long leg of the said J-box, said means including a pair of meshing star-shaped rolls and a rigid bar mounted in an inclined position above the rolls in such manner that the incoming tow can be fed into the nip of the rolls, then around the roll and then over the rigid bar, which latter causes the tow to space itself on the roll about which is it wound; means for driving said rolls; means for aligning the tow and removing tangles therefrom after the tow leaves the outlet of the short leg of the said J-box and before it leaves the said cylindrical vessel through the aforementioned outlet port; means including a standpipe for maintaining hot water at the desired level in the lower part of the said cylindrical vessel; means including a pump for circulating the said hot water through the said J-box; means for introducing superheated steam beneath the level of the said hot water that is in the lower part of the said cylindrical vessel; and a quick-opening door in the side wall of the said vessel for ready access to the tow therein during operation of the apparatus.

References Cited in the file of this patent
UNITED STATES PATENTS

| | | |
|---|---|---|
| 761,107 | Muntadas | May 31, 1904 |
| 2,029,985 | Clark | Feb. 4, 1936 |

UNITED STATES PATENT OFFICE
CERTIFICATE OF CORRECTION

Patent No. 3,027,740                      April 3, 1962

Mario Sonnino

It is hereby certified that error appears in the above numbered patent requiring correction and that the said Letters Patent should read as corrected below.

Column 2, lines 7 and 8, for "Aquagel or Hydrogel" read -- aquagel or hydrogel --; line 69, for "stream" read -- steam --; column 10, line 16, for "hot-stretached" read -- hot-stretched --; column 12, line 19, for "80%" read -- 90% --; column 13, line 10, for Roman numeral "II" read -- III --; column 16, line 34, for "is it" read -- it is --.

Signed and sealed this 23rd day of October 1962.

(SEAL)
Attest:

ERNEST W. SWIDER                      DAVID L. LADD
Attesting Officer                     Commissioner of Patents